United States Patent [19]
Littleton

[11] Patent Number: 5,109,504
[45] Date of Patent: Apr. 28, 1992

[54] GRAPHICS PROGRAM ADAPTOR

[75] Inventor: James G. Littleton, Houston, Tex.

[73] Assignee: Texas Instruments Incorporated, Dallas, Tex.

[21] Appl. No.: 458,939

[22] Filed: Dec. 29, 1989

[51] Int. Cl.$^5$ .............................................. G06F 9/00
[52] U.S. Cl. ...................... 395/500; 364/261; 364/946.7
[58] Field of Search ............ 364/200, 900, 521; 340/701, 794; 358/903; 371/19

[56] References Cited

U.S. PATENT DOCUMENTS

| | | | |
|---|---|---|---|
| 4,028,684 | 6/1977 | Divine et al. | 364/900 |
| 4,400,798 | 8/1983 | Francis et al. | 365/174 |
| 4,542,453 | 9/1985 | Patrick et al. | 364/200 |
| 4,566,004 | 1/1986 | Emerson | 340/771 |
| 4,751,703 | 6/1988 | Picon et al. | 364/200 X |
| 4,769,767 | 9/1988 | Hilbrink | 364/200 |
| 4,791,558 | 12/1988 | Chaitin et al. | 364/200 |
| 4,819,234 | 4/1989 | Huber | 371/19 |
| 4,858,114 | 8/1989 | Heath et al. | 364/200 |
| 4,866,665 | 9/1989 | Haswell-Smith | 364/900 |
| 4,870,406 | 9/1989 | Gupta et al. | 340/70 |
| 4,924,413 | 5/1990 | Suwannakul | 364/521 |
| 4,954,941 | 9/1990 | Redman | 364/200 |

Primary Examiner—Michael R. Fleming
Assistant Examiner—Glenn A. Auve
Attorney, Agent, or Firm—Robby T. Holland; Richard Donaldson; James F. Hollander

[57] ABSTRACT

An adapter for modifying graphics software programs at load time. The invention is a process, which may be part of a hardware or firmware configuration used with a computer system, and which scans the program for selected instructions representing routines to be replaced with a substitute routine. If such an instruction is encountered, the instruction is replaced with an interrupt trap. The substitute graphics routine is located at an address stored at the interrupt trap location.

26 Claims, 2 Drawing Sheets

GRAPHICS PROGRAM ADAPTOR

TECHNICAL FIELD OF THE INVENTION

This invention generally relates to computer graphics processing, and more particularly to a graphics program adapter for modifying an existing graphics program for use with alternative hardware configurations.

BACKGROUND OF THE INVENTION

Many present day computer graphics techniques use graphics instructions to modify bits in memory, those bits having a direct screen representation. Hardware devices, sometimes referred to as "backend logic devices", take care of extracting these bits from memory and serializing them for screen display as pixels. This is the case for many existing graphics processors.

These graphics processors generally use low level instructions, such as fill, draw, and line routines, to implement the placement of pixel data into memory. These routines are generally written for raster scan displays, which are designed for modification of pixels in a bitmap and direct screen representation. For most raster scan displays, no further action in addition to these routines is necessary for generating a display.

However, for some displays, such as the newer flat panel displays, these drawing routines are not sufficient. For example, the flat panel displays require special display dependent operations to increase refresh rates. This requires the graphics program to include instructions directed to use of that display, in addition to instructions for placing pixel data in memory. To rewrite existing graphics software for such displays would be costly and time consuming and would require access to the source code. Rewriting the software would also defeat attempts at graphics standardization.

Another example of a situation in which a graphics program must be modified for use with different hardware is when the program is written for a color display system but is desired to be run on a monochrome display system. In this situation, the graphics program must be modified so that bits that represent monochrome pixels, rather than color bits, are placed in memory.

Thus, a need exists for adapting existing graphics programs for use with different hardware configurations, such as systems having display-dependent operations. Ideally, the adaptation should operate on the user's program in a manner that does not require reprogramming by some other party. Thus, the invention permits code that is already loaded to the user's system to be replaced with substitute code.

SUMMARY OF THE INVENTION

A basic concept of the invention is that a computer may be used at load time of a user's program to search for and replace portions of a computer program. In most general terms, the searching feature of the invention finds selected instructions that are to be replaced. Typically, these instructions will represent routines that require certain display-dependent program code in order for the routine to run on the user's graphics display hardware. The replacing feature uses a trap interrupt to redirect program execution to a substitute routine.

One aspect of the invention is a computer graphics system having a graphics software adapter for modifying a graphics program. The adapter has a scanner for searching the program code and replacing certain instructions with interrupt trap instructions. The adapter also has an extender that locates substitute routines in memory and places the addresses of these routines in the trap location. This permits the substitute code to be executed instead of the original instruction.

Another aspect of the invention is a method of using a computer to modify an existing graphics program for use with different hardware. The method comprises the steps of scanning the program code for a certain instruction that represents a hardware dependent operation. The instruction is replaced with an interrupt trap instruction. A substitute routine, which enables operation of the program on the present hardware, is then placed in memory such that its address is at the trap location.

A specific application of the method is with an alternative display having specific display requirements. For example, certain displays require a specific operation to refresh the display screen. The method is used to find display dependent graphics instructions and replace them with substitute graphics code.

A technical advantage of the invention is that a user's graphics program may be modified while loaded on the user's hardware system. No reprogramming is required. The invention is dynamic in the sense that program execution is redirected to substitute code as needed during program execution, using interrupts.

BRIEF DESCRIPTION OF THE DRAWINGS

The novel features believed characteristic of the invention are set forth in the appended claims. The invention itself, however, as well as modes of use and advantages, is best understood by reference to the following description of illustrative embodiments and the accompanying drawings.

DETAILED DESCRIPTION OF THE INVENTION

For purposes of this description, a "graphics program" is used with reference to a computer program, typically an applications program, which uses graphics routines. These routines are represented by "graphics instructions", with each graphics instruction being used to perform a particular operation. The description below is directed to assembly language mnemonics to represent opcodes, more specifically, the mnemonics used with the TMS34010 graphics processor manufactured by Texas Instruments, Inc., rather than actual bit representations of these opcodes. However, the invention is not limited to assembly level programs, and could be used to find any type of computer instruction.

Figure 1:
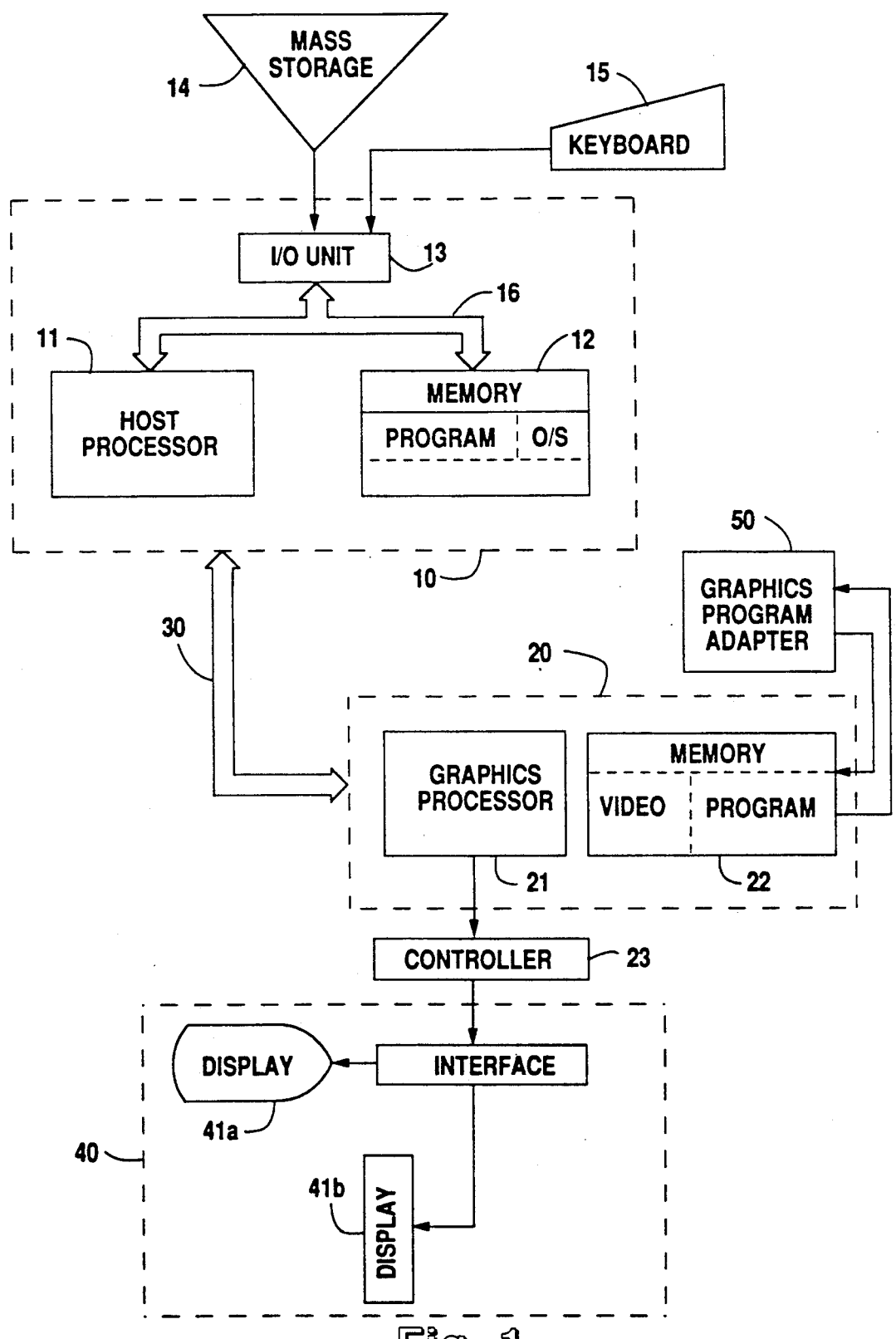
FIG. 1 is a block diagram of the hardware aspects of the invention, a computer systems having a graphics adapter for adapting graphics software for use with an alternative display.

FIG. 1 illustrates a computer graphics system having a graphics program adapter 50 in accordance with the invention. As shown in FIG. 1, the computer system with which the invention is used has both a host processor system 10 and a graphics processor system 20. The two system are in communications by means of a bus 30. Graphics processor system 20 runs in parallel with host processor system 10, calculating and manipulating graphics information, while host processor system 10 continues with other processing tasks. Thus, each processor has its own operating system. The graphics processor system is in communication with a display system 40. Each of these systems are described in further detail below.

Although FIG. 1 illustrates a multiprocessor system, as explained below, the multiprocessor configuration is not necessary to the invention. Alternatively, the graphics programming may be executed by host processor system 10, which would be in communication with graphics system 40. The graphics program adapter 50 that implements the invention could be in communication with host system 10.

Host processor system 10 has a host processor 11, which typically is optimized for peripheral management, such as the Intel 80286 and 80386 processors. These processors are used with DOS-based personal computer systems, but the invention is not limited to DOS operating systems. In fact, the methods and mechanisms described herein may be implemented using a variety of processors and operating systems. Memory 12 associated with host processor 11 includes random access memory (RAM), which permits host processor 11 to access programs that direct its operations. As indicated in FIG. 1, host processor 11 is associated with its own operating system, which may be implemented with various software and hardware devices.

Graphics processor system 20 has a graphics processor 21, which is designed for graphics processing and is programmable. An example of such a processor is the 34010 graphics processor, manufactured by Texas Instruments, Inc., which is a 32 bit microprocessor with instruction set extensions for graphics processing as well as hardware for display device control and refresh tasks. Local memory 20 includes RAM memory so that graphics processor 21 can store programs that instruct it how to process graphics information.

A communication means between the two processors 11 and 21 is embodied by bus 30. Bus 30 is bidirectional and provides a data path and control lines. The memories 12 and 22 of systems 10 or 20 may further include a communications buffer (not shown) that can be accessed by both processor systems 10 and 20. Other hardware implementations of a communications means are possible with the primary requirement being that each processor 11 and 21 have access to parameter space for handshaking between processors, function identification space to identify the function being called, and data space to pass command arguments and additional data. The configuration shown in FIG. 1 is only one of numerous means for providing interprocessor communications, and other means are easily developed. Furthermore, although FIG. 1 shows the two processor systems, 10 and 20, as having separate memories 12 and 22, the communication means may be a shared memory.

The multiprocessor system of FIG. 1 operates with various standard peripheral devices, notably mass storage 14 and input means, such as a keyboard 15. An input/output circuit 13 is used to communicate information in appropriate form between these input and output devices and host system 10 via a host system bus 16.

Display system 40 includes at least one display 41a or 41b. Display 41a or 41b is an "alternative display" in the sense that it has display dependent software operations, which are not necessarily included in the software to be loaded on the computer system. For example, display system 40 may have a flat panel display 41b, having special requirements for graphics programming. The graphics program may, for example, be written for use with another type of display, such as a raster scan display 41a.

Graphics program adapter 50 is the primary implementation of the invention. The functionality of display adapter 50 is discussed below in connection with FIG. 2. Display adapter 50 may be implemented as a software program, or may be implemented as programmed hardware or firmware, in which case, FIG. 1 illustrates an apparatus aspect of the invention.

FIG. 1 illustrates display adapter 50 in communication with graphics processor system 20. This is because the invention is especially useful in connection with a computer system having special graphics processor, such as processor 21. Such systems tend to use special graphics routines represented by special instructions. It should be understood, however, that the invention is not limited to systems having a separate graphics processor, such as graphics processor 21. In such systems, graphics routines are executed by a general purpose processor, such as host processor 11. If these routines are display dependent, they may also be located and replaced in accordance with the invention. Display adapter 50 would then be in communication with memory 12 of host system 10. In either event, controller 23 is used to interface processor 11 or 21 with display system 40.

Figure 2:
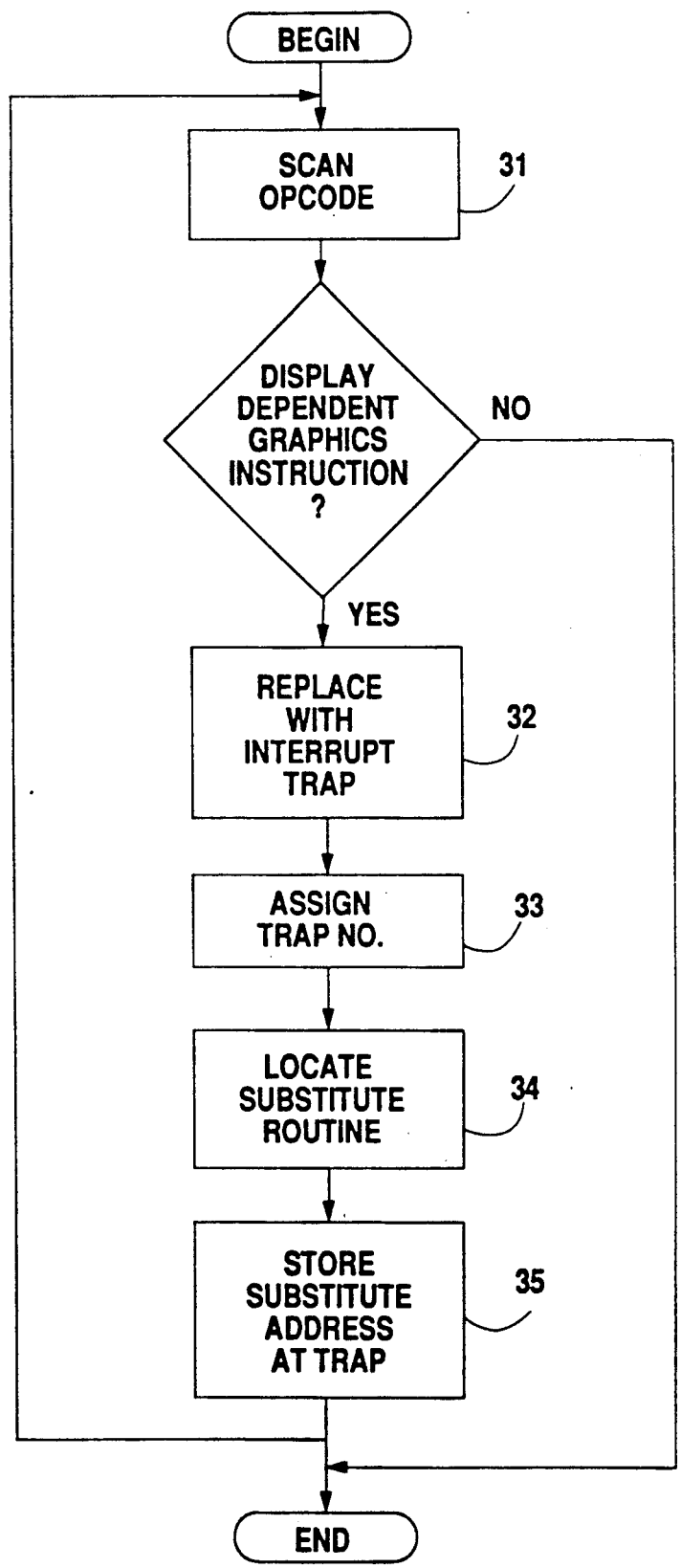
FIG. 2 is a flow diagram of the method of the invention, a process for adapting graphics software for use with an alternative display device.

FIG. 2 illustrates another aspect of the invention, a method of using a computer to adapt existing graphics software for use on an alternative display. In this aspect of the invention, the invention is implemented as software and it may be written in any suitable software programming language. The steps of the method are described in functional terms, and it is believed that software for implementing the invention may be written by one having ordinary skill in the art of computer operating systems and memory management.

In the following description, the method occurs when the graphics program is loaded into memory 22 for execution. In this connection, the invention may be implemented as a utility that is part of the loader. However, in alternative embodiments of the invention, the method could occur dynamically, in the sense that the scanning and replacing occur as needed during program execution.

Step 31 is scanning the program code for selected graphics instructions. The selected instructions may be any instruction that represents an operation that is desired to be modified to suit the computer system. Typically, the selected instructions represent routines that are not functional in the absence of certain display-dependent program code. The old, scanned for, instruction is referred to herein as the "obsolete" instruction, and the routine to be substituted is referred to as the "substitute" routine.

As discussed above, the obsolete graphics instructions may be an instruction associated with a special graphics processor, such as graphics processor 21. In any event, it is assumed that the obsolete instruction is represented by a identifiable code in the graphics program.

Step 32, which occurs if an obsolete instruction is found, is replacing the obsolete instruction with an interrupt trap. The interrupt is a "trap" in the sense that it is initiated from within the scanning program. Furthermore, the interrupt is a vectored interrupt in that it operates in conjunction with an interrupt vector table that stores the address of the routine that is to be executed after the interrupt is encountered at run time.

The invention departs from the traditional use of interrupts, whereby interrupts are used to divert a processor's execution from an applications program to some unrelated program or system function. Instead of the traditional use, the invention uses interrupts to change the functionality of an applications program.

As stated above, the invention may be implemented as part of the loading process. If this is the case, the address of the obsolete code is known. If not, the address of the obsolete code must be provided for use during the scanning step 31.

Step 33, which occurs if said interrupt trap is not already assigned a number by the system software, is assigning a trap number to said vector trap. Typically, the trap number will be part of a trap vector table, in which each interrupt trap has a unique trap number. The trap number is used as an address to a location on the trap vector table. This permits a number of traps to be used, each associated with a different obsolete instruction.

Step 34 is assigning an address to a substitute graphics routine that will replace the obsolete routine. This substitute routine emulates the function performed by the obsolete routine, but also contains whatever display dependent code is required for that routine. The substitute routine may be already loaded, or the loading may be a part of step 34.

Step 35 is storing the starting address of the substitute graphics routine at the interrupt trap location in the trap vector table. To accomplish this step, several relationships are established. An identifier of the obsolete function is matched with an identifier of the substitute routine. Also, an identifier of the obsolete function is matched with a trap location. Thus, once the address of the substitute function is known, it can be matched with the trap location.

As a result of the foregoing process, the graphics program is now adapted for use on the alternative display. During program execution, when the interrupt trap instruction is encountered, the system software will determine the trap number and read the address for that trap number. The system software then calls the substitute routine that is located at that address. At this point, execution jumps to the substitute routine at the address specified in the interrupt vector table. After execution of the substitute routine, the system software returns to the graphics program.

EXAMPLE OF THE INVENTION

To illustrate the result of using the invention, the following is a typical graphics routine:

```
fill_rect:
    movi        0.SADDR
    movi        [320,200],DADDR
    movi        [10,10],DYDX
    fill        XY
    movi        BLUE,COLOR1
    drav        A0,A1
    rets        0
``` where the fill instruction is display dependent. It is desired to use the above routine for an alternative display. After execution of the method of the invention, the code appears as:

```
fill_rect:
    movi        0.SADDR
    movi        [320,200],DADDR
    movi        [10,10],DYDX
    trap        30
    movi        BLUE,COLOR1
    drav        A0,A1
    rets        0
``` where the fill opcode has been replaced with trap, an interrupt trap instruction. The trap operand, 30, represents an address in the trap vector table. Location 30 of the trap vector table contains the address of the substitute graphics The substitute graphics routine has the form:

```
srv_fill_xy:    FILL XY
                ...             ;extended code starts here
                ...
                ...             ;extended code ends here
                RETI            ;return from interrupt trap
```

During program execution, when the trap instruction is encountered, the programming is directed to the address of the trap server subroutine. After execution of the subroutine, the program execution returns to the originating routine.

OTHER EMBODIMENTS

Although the invention has been described with reference to specific embodiments, this description is not meant to be construed in a limiting sense. Various modifications of the disclosed embodiments, as well as alternative embodiments of the invention will be apparent to persons skilled in the art. It is, therefore, contemplated that the appended claims will cover all modifications that fall within the true scope of the invention.

What is claimed is:

1. A computer system for modifying a graphics software program, wherein said graphics software program is operative with a graphics hardware system having display hardware dependent program code, said computer system comprising:

a processor for executing graphics instructions called by said graphics software program;

a program memory for storing said graphics software program, said memory being accessible by said processor;

a graphics program adapter, coupled to said program memory, for scanning graphics instructions stored in said memory, and said graphics program adapter being configured to select an instruction representing an operation requiring said display dependent program code and to replace said instruction with an interrupt trap instruction; and an interrupt vector memory coupled to said processor and said graphics program adapter storing an address of a substitute routine associated with said interrupt trap.

2. The computer system of claim 1, wherein said processor is a graphics processor.

3. The computer system of claim 2, wherein said program memory is memory local to said graphics processor.

4. The computer system of claim 2, and further comprising a host computer system in communication with said graphics processor.

5. The computer system of claim 1, wherein said interrupt memory is a trap table memory for storing a trap number associated with said interrupt trap.

6. The computer system of claim 1, wherein said graphics program adapter is further configured to load an address for said display dependent program code at a location associated with said interrupt trap instruction.

7. The computer system of claim 1, wherein said display hardware dependent program code is associated with an alternative display device, and further comprising said alternative display device 8. The computer system of claim 1, wherein said processor is used with DOS-based personal computer systems.

9. The computer system of claim 1, wherein said graphics program adapter comprises programmed hardware.

10. The computer system of claim 1, wherein said graphics program adapter comprises firmware.

11. The computer system of claim 1, further comprising a display system and a controller interfacing said processor with said display system.

12. The computer system of claim 11, wherein said display has display dependent software operations.

13. The computer system of claim 11, wherein said display system includes a flat panel display.

14. The computer system of claim 11, wherein said display system includes a raster scan display.

15. A method of using a computer for modifying a graphics program, comprising the steps of:
scanning said graphics program for an obsolete display dependent program instruction;
replacing said obsolete display dependent program instruction with an interrupt trap instruction, said interrupt trap instruction having a trap location;
assigning an address to a substitute graphics routine; and
storing said address of said substitute graphics routing at said interrupt trap location.

16. The method of claim 15, wherein said obsolete instruction represents an operation requiring display-dependent code, and wherein said substitute graphics routine has said display dependent code.

17. The method of claim 15, wherein said interrupt trap instruction of said obsolete instruction is an opcode instruction having a numerical representation in memory.

18. The method of claim 17, and further comprising the steps of loading said graphics program before said scanning step and loading said substitute graphics routine into memory of said computer after said storing step.

19. The method of claim 15, wherein said method is performed when said graphics program is loaded to memory of a computer system with which it is to be executed.

20. A method of using a computer for modifying a graphics program, said graphics program having at least one display dependent instruction, for use with an alternative display device, comprising the steps of:
scanning said graphics program for said display dependent instruction;
replacing said instruction with an interrupt trap instruction, said interrupt trap instruction having a trap location;
assigning an address to a substitute graphics routine; and
storing said address of said substitute graphics routine at said interrupt trap location.

21. The method of claim 20, wherein said display dependent instruction is an instruction that includes placing bits representing a screen display in memory, and wherein said substitute routine has instructions for refreshing said display.

22. A computer system for modifying an applications program, said computer system comprising:
a processor for executing graphics instructions called by said applications program;
a program memory for storing said applications program, said memory being accessible by said processor;
a graphics program adapter coupled to said memory, for scanning graphics instructions in said memory, and said graphics program adapter being configured to select an instruction representing an operation requiring display dependent program code and to replace said instruction with an interrupt trap instruction; and
an interrupt vector memory accessible by said processor wherein said graphics program adapter stores an address of a substitute routine associated with said interrupt trap.

23. The computer system of claim 22, wherein said applications program uses graphics routines.

24. The computer system of claim 23, wherein said graphics routines are represented by graphics instructions, and wherein each said graphics instruction is used to perform a particular operation.

25. A computer system for modifying a graphics software program, wherein said graphics software program is operative with a graphics hardware system having display dependent program code, said computer system comprising:
a processor for executing graphics instructions called by said graphics program;
a program memory for storing said graphics program, said memory being accessible by said processor;
a graphics program adapter coupled to said memory, for scanning graphics instructions in said memory, and said graphics program adapter being configured to select an instruction representing an operation requiring said display dependent program code and to replace said instruction with an interrupt trap instruction.

26. The computer system of claim 25, wherein said program memory includes interrupt vector memory accessible by said processor for storing an address of a substitute routine associated with said interrupt trap.

* * * * *